US007257498B2

(12) United States Patent
Thalore et al.

(10) Patent No.: US 7,257,498 B2
(45) Date of Patent: Aug. 14, 2007

(54) SYSTEM AND METHOD FOR THE SAFE AUTOMATIC DETECTION OF A FIELD DEVICE COMMUNICATING WITH CURRENT MODULATED SIGNAL

(75) Inventors: Sudhir Thalore, Horsham, PA (US); Brian Reynolds, Philadelphia, PA (US); Frank D. Rugienius, Ambler, PA (US); Charles L. Martin, Blue Bell, PA (US); Sunil M. Ingawale, Pune (IN)

(73) Assignee: Honeywell International Inc., Morristown, NJ (US)

( * ) Notice: Subject to any disclaimer, the term of this patent is extended or adjusted under 35 U.S.C. 154(b) by 508 days.

(21) Appl. No.: 11/000,576

(22) Filed: Nov. 30, 2004

(65) Prior Publication Data

US 2005/0125173 A1    Jun. 9, 2005

Related U.S. Application Data

(60) Provisional application No. 60/526,548, filed on Dec. 4, 2003.

(51) Int. Cl.
*G01R 19/00* (2006.01)
*G06F 19/00* (2006.01)
*G05B 11/01* (2006.01)

(52) U.S. Cl. .................. 702/64; 710/8; 324/76.11; 700/1; 700/17; 702/65

(58) Field of Classification Search ............... 702/64; 710/8; 324/76.11; 700/1; 713/1, 300
See application file for complete search history.

(56) References Cited

U.S. PATENT DOCUMENTS

| 5,828,576 | A  | * | 10/1998 | Loucks et al. | ............... 702/65 |
| 5,980,078 | A  | * | 11/1999 | Krivoshein et al. | ............ 700/1 |
| 6,618,630 | B1 | * |  9/2003 | Jundt et al. | ................... 700/17 |
| 2002/0184410 | A1 | * | 12/2002 | Apel et al. | ..................... 710/5 |
| 2003/0014536 | A1 | * |  1/2003 | Christensen et al. | ........ 709/238 |

FOREIGN PATENT DOCUMENTS

WO    WO 02/077732 A1    10/2002

\* cited by examiner

*Primary Examiner*—Rehana Perveen
*Assistant Examiner*—Anand B. Patel
(74) *Attorney, Agent, or Firm*—Ohlandt, Greeley, Ruggiero & Perle, LLP (57) ABSTRACT

A current generator that provides a first current level to read a configuration parameter of a field device. The current generator also provides a second current level. The first current level is lower in amperage than the second current level. The first current level does not operate the field device. The second current level operates the field device. A current sensor is connected in circuit with the field device. The current sensor reads the configuration parameter associated with the first current level. A method is provided that creates a current that reads a configuration parameter. The current has less than a minimum amplitude to operate necessary to operate a field device. The configuration parameter is read from the field device through employment of the current. The field device is configured through employment of the configuration parameter.

20 Claims, 7 Drawing Sheets

SYSTEM AND METHOD FOR THE SAFE AUTOMATIC DETECTION OF A FIELD DEVICE COMMUNICATING WITH CURRENT MODULATED SIGNAL

CROSS-REFERENCE TO RELATED APPLICATIONS

The present application is claiming priority of U.S. Provisional Patent Application Ser. No. 60/526,548, entitled "System and Method for the Safe Automatic Detection of a Field Device Communicating With Current Modulated Signal" filed on Dec. 4, 2003, the content of which is incorporated by reference herein.

BACKGROUND OF THE INVENTION

1. Field of the Invention

The present disclosure relates to the sensing and configuration of devices, and more particularly, to the sensing and configuration of devices through the use of a reduced current.

2. Description of the Related Art

A number of protocol specifications, like the HART® (Registered Trademark of the HART Communications Foundation) communication protocol, are designed to support digital communications. These digital communications can be used for the measurement of various processes and parameters of various control devices. These digital communications, within these protocol specifications, typically occur over a traditional range of 4-20 milliAmps (mA). Generally, these digital communications provide host control systems with process and diagnostic information associated with a field device. The digital communications can occur as the host control system monitors and controls an industrial process.

One purpose of such protocol specifications is to establish standards so that "hosts" {or "input/output (I/O) masters"} can communicate with field "devices" ("slaves") developed by different vendors. One subset of the protocol specifications is classified as having "common functions." "Common functions" requires that the host or device have to meet all standards within this subset of protocol specifications. This allows the host to require only a single interface layer to support a variety of field devices from many different vendors.

However, other components of the protocol specification are classified as "device-specific," and are defined by the individual device manufacturer. Since at least some of the digital data that will be passed between a host or I/O Master and the field device is specific to the given field device type, it is important to know what kind of field device is connected to the host control system prior to using the field device within an industrial process in real-time.

In other words, due to the nature of device-specific components of field devices, it is necessary to obtain and verify pertinent information regarding the identification of the field device prior to configuration load and execution. Generally, configuration load and execution can be defined as the initialization of the field device for use in the field, and the actual employment of the field device. Pertinent information can include a unique identifier for a given field device, the vendor name for the field device, the firmware revision installed in the field device, the tag name (that is, the pseudonym) for the field device, description of the field device, and the various range limits that the field device can measure or apply. Without the above information derived from the initial start-up of a field device, it is difficult to integrate device specific data into a real-time process control strategy.

Typically, input devices are current sourcing type, and output devices are a current sinking type. A sensor is an example of an input device and a valve is an example of an output device. Employment of a "base signal" of the sourcing current provides at least two functions. It provides the power to charge up, and initially configure, the field devices, and the base signal also is the carrier over which digital information is conveyed. For a current sinking device, the I/O master should drive the current for providing the "base" signal associated with these protocols. Therefore, for output devices, the host or I/O master provides a minimal specified current in order for the digital communication, with aid of the protocol specifications, to function.

Conventional protocol specifications required users to initially load a control configuration (perhaps with the use of wrong initial control configuration), activate the control strategy, and drive the output (sourcing) current to a base amount required for communication with the field device. This occurred over a traditional range of 4-20 mA. Only then could the actual device identification and configuration data be collected. However, as can be appreciated, this could lead to significant errors in implementing an initial real-time control strategy.

An alternative approach, used in other conventional protocol specifications, was to always provide a minimal current of 4 mA. However, this approach is not acceptable, as it is unsafe to power up a field device that is not initially configured. In any event, a user would have no control of the output devices if a problem would cause the field device to render itself unresponsive to the current.

In conventional technologies, to run field devices, current is applied to the field device after configuration, as after configuration it is controllable. However, during a 4 mA power up to the field device, current is applied even without any configuration, and therefore is no way to control the field device. However, if anything goes wrong after applying the 4 mA current, there is no way to control the field device. Another issue is that in this prior art scenario, the minimal current will be omnipresent, which can create safety problems.

Therefore, there is a need to safely and securely establish communication with a field device and acquire the field device identification data using a current modulated signaling technique, prior to a configuration load.

SUMMARY OF THE INVENTION

There is a provided a current generator that provides a first current level to read a configuration parameter of at least one field device. The first current level is lower in amperage than a second current level. The first current level does not operate the field device. The current generator also provides the second current. The second current level operates said field device. A current sensor is connected in circuit with the field device. The current sensor detects the configuration parameter(s) associated with the first current level.

DESCRIPTION OF THE INVENTION

The term "module" is used herein to demarcate a functional operation that may be embodied either as a stand-alone component or as one of a plurality of modules in an integrated assembly.

Figure 1:
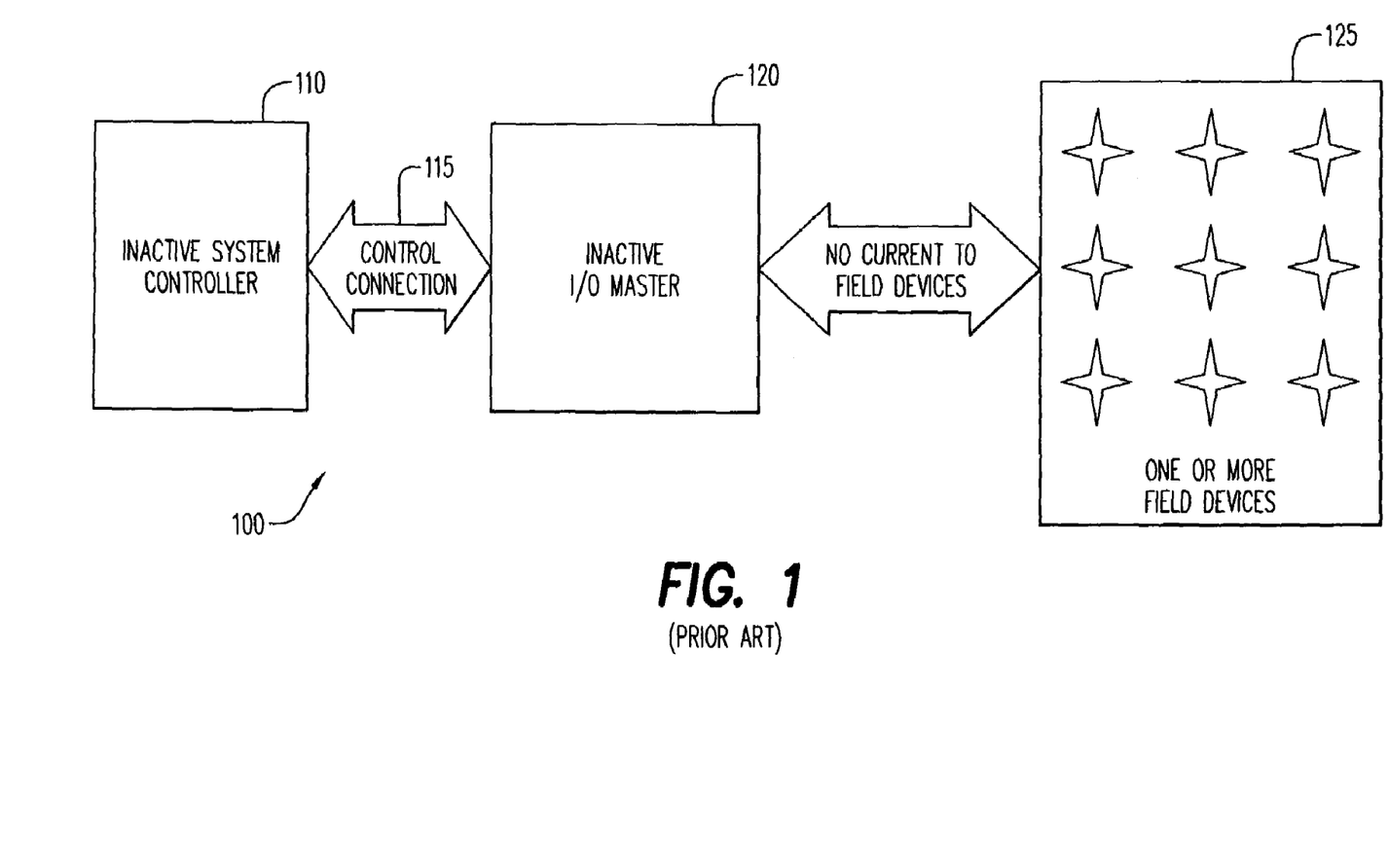
FIG. 1 is diagram of a prior-art control system before configuration.

Referring to FIG. 1, illustrated is a prior-art unconfigured system 100 having an inactive system controller 110 and an inactive I/O master 120 and one or more field devices 125. Coupled between inactive system controller 110 and inactive I/O master 120 is a control connection 115. Control connection 115 is unpowered, and inactive system controller 110 and inactive I/O master 120 are not configured. Therefore there is no current to field devices 125. Furthermore, no configuration information has been retrieved from the one or more field devices 125.

The inactive system controller 110 represents an apparatus device, hardware, software or both, that can execute control algorithms which are used to control one or more field devices 125.

In one embodiment, one example of an inactive system controller 110 is a C200 module in an Experion Process Knowledge System™ (PKS). Experion PKS is an integrated platform for which controls, manages and seeks to optimize process operations, diagnostics and domain knowledge. C200 is a device that is employed to control process operations, such as in Experion PKS.

Figure 2:
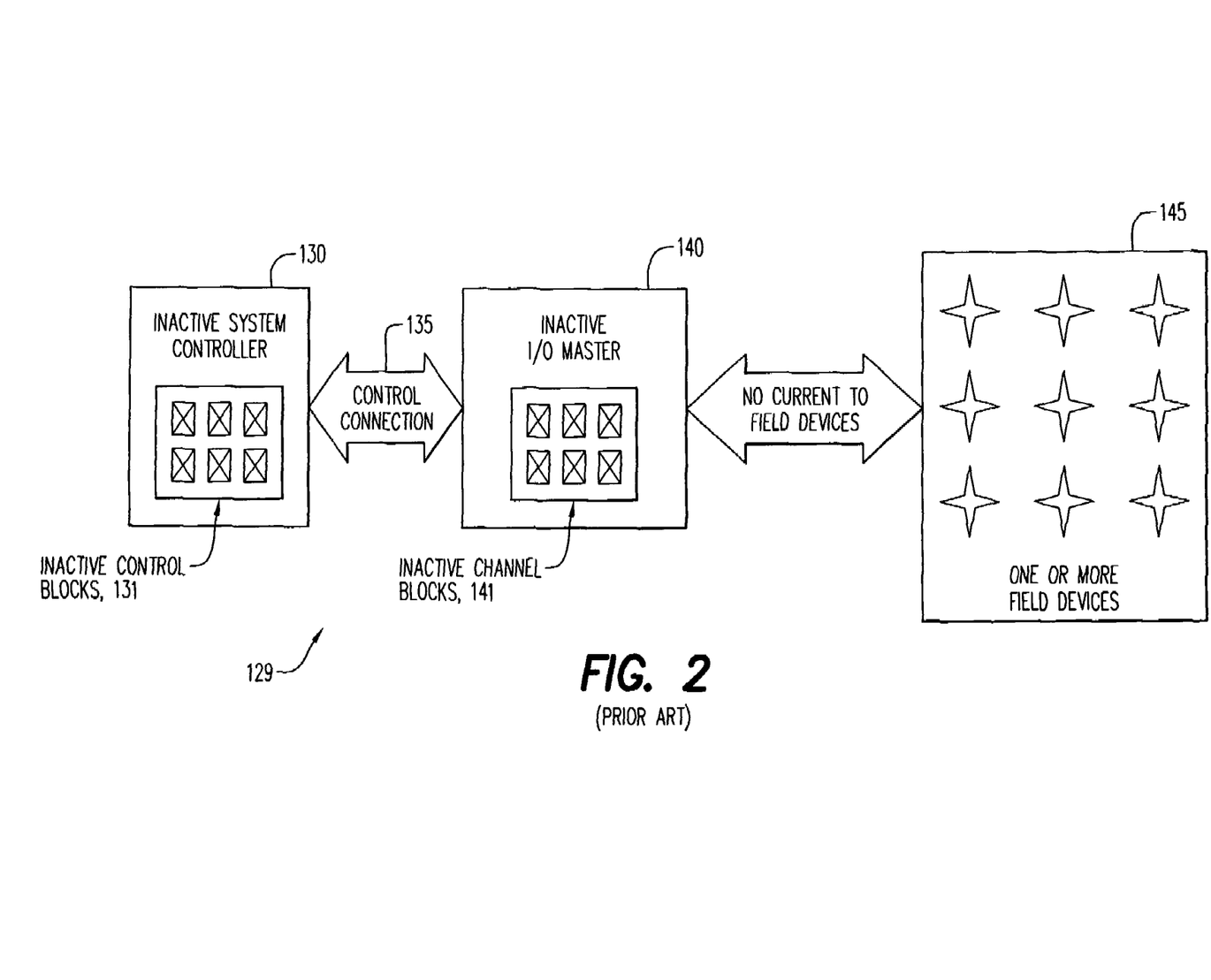
FIG. 2 is diagram of a prior-art configuration of a system controller and a master in an inactive status.

Turning now to FIG. 2, illustrated is a prior-art initially configured system 129 including an inactive system controller 130 with inactive control blocks 131 and an inactive I/O master 140 with inactive channel blocks 141 and one or more field devices 145. Coupled between inactive system controller 130 and inactive I/O master 140 is a control connection 135. Control connection 135 conveys information between the inactive system controller 130 and inactive I/O master 140.

Inactive system controller 130 is illustrated as having one or more inactive control blocks 131. Control blocks are the logical representations of real time control algorithms/strategies, such as a "Proportional-Integral-Derivative" control algorithm for controlling and monitoring one or more field devices 145. However, in inactive system controller 130, the control blocks are inactive control blocks 131. Therefore, although control blocks have been created, they are not yet being employed. Inactive control blocks 131 have been configured with initial/preexisting configuration data not derived from a direct reading of one or more field devices 145.

Inactive I/O Master 140 is illustrated as having one or more inactive channel blocks 141. Channel blocks are, generally, logical representations of data associated with one or more field devices 145. Employment of channel blocks allows the device configurations to be integrated into control strategy. However, in initially configured system 129, the control clocks are inactive control blocks 141. Therefore, there is no current to one or more field devices 145, and inactive control blocks 141 have been configured with initial/preexisting configuration data not derived from a direct reading of one or more field devices 145.

Figure 3:
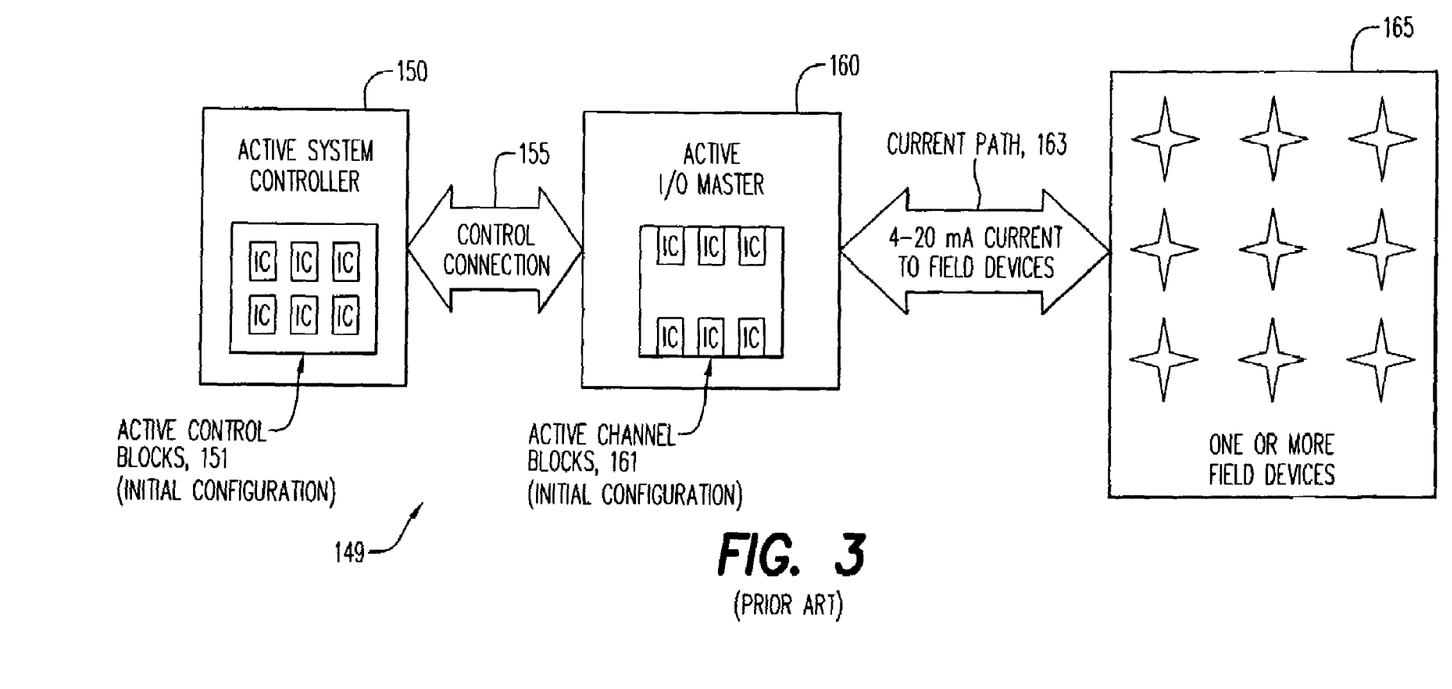
FIG. 3 is a diagram of a prior-art configuration of a system controller and a master in an active status.

Referring to FIG. 3, illustrated is a prior-art initially configured system 149 that includes an active system controller 150 with active control blocks 151, an active I/O master 160 with active channel blocks 161, and one or more field devices 165. Coupled between active system controller 150 and active I/O master 160 is a control connection 155.

Active control blocks 151 have been loaded with an initial configuration. Control connection 155 is illustrated as an "Output Percent" of 0% to 100% (OP). OP is equivalent to output current 4 mA to 20 mA. When channel blocks are active and OP is 0%, 4 mA is driven to the current path 163 by the system and when it is 100%, 20 mA is driven. Active channel blocks 161 have also been loaded with the initial/pre-existing configuration parameters. Active channel blocks 161 of active I/O master 160 are actively interfacing with one or more field devices 165 over a current path 163. Therefore, there is a 4-20 mA current sent to one or more field devices 165. The 4-20 mA current powers one or more field devices 165, but uses the parameters loaded within the initial configuration of active control blocks 151 and active channel blocks 161 to do so.

Figure 4:
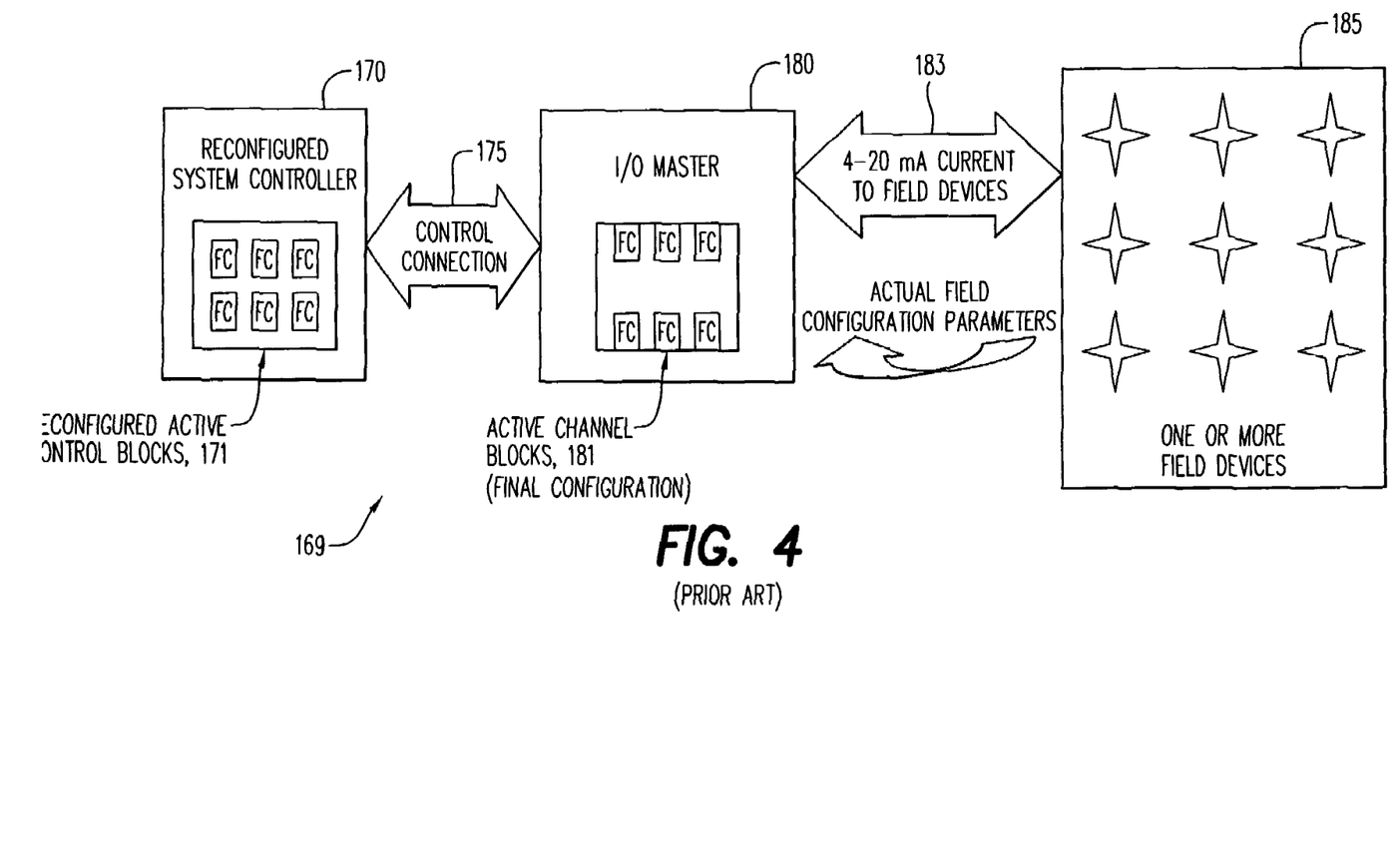
FIG. 4 is a diagram of a prior-art configuration of a configured system controller and master.

Referring to FIG. 4, illustrated is a prior-art reconfigured system 169 illustrating the reconfiguration of a reconfigured system controller 170, a reconfigured I/O master 180 after both have received updated actual configuration parameters from one or more field devices 185 over a current path 183. A control connection 175 couples reconfigured system controller 170 and reconfigured I/O master 180.

In reconfigured system 169, after one or more field devices 185 are activated through application of the 4-20 mA current, the final identification/configuration data for each one or more field device 185 is retrieved from one or more field device 185 over current path 183. The final configuration of reconfigured active control blocks 171 of reconfigured system controller 170 and reconfigured active channel blocks 181 of reconfigured I/O master 180 is, therefore, modified in accordance therewith with the discovered final one or more field device 185 reconfiguration information. In reconfigured system 169, this can be digital information stored within one or more field devices 185, conveyed over the 4-20 mA current over current path 183.

Generally, as can seen from FIGS. 1-4, the 4-20 mAs which is employed to power one or more field devices, is first driven in initial configuration of the active control blocks 151 and active channel blocks 161. However, the actual digital configuration parameters of one or more field devices 185 are not read until after the current is applied, as illustrated in reconfigured system 169. Therefore, the initial configurations of active control blocks 151 and active channel blocks 161 could be based upon erroneous information and parameters. Only after the initial system power up is completed in reconfigured system 169 are the actual configuration parameters associated with one or more field devices 185 taken into account within reconfigured system controller 170 and reconfigured I/O 180. This can lead to serious errors in configuration, which can create safety or work concerns when employing a real-time control strategy that relies upon the accuracy of this initial configuration information.

One such problem is that when the initial configuration load is done and the devices are put into run state, a contact with the device has not yet been established. If there are some problems with the device, system 100, 200, 300, or 400 will be able to detect only some time after a field device is in its run state. This could be catastrophic.

Figure 5:
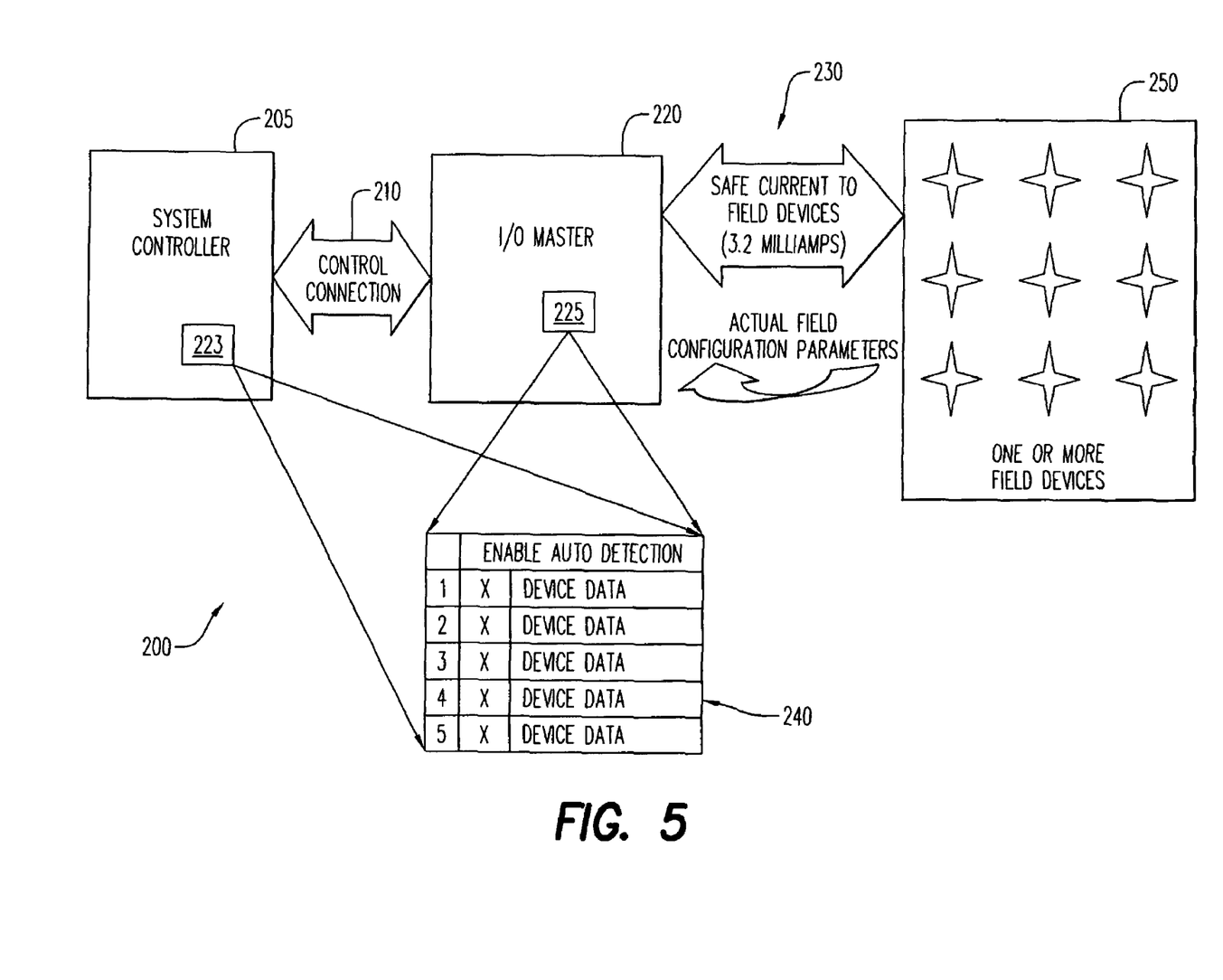
FIG. 5 is diagram of a configuration of devices with employment of an "auto-detect" option.

Turning now to FIG. 5, illustrated is a configuration system 200 using a configuration detection feature for the digital information programmed in one or more field devices 250. Generally, configuration system 200 employs a safe and a secure method to provide control system users with digital identification parameters prior to configuring the various system controllers and I/O masters. Configuration system 200 includes a system controller 205, an I/O master 220, and an auto-detector 240 that provides for the detection of actual digital configuration information from one or field devices 250 prior to applying the standard 4.0-20.0 mA of current. The actual configuration parameters that were originally digitally stored in one or more field devices 250 are then used in I/O master 220 or system controller 205, as opposed to using user-defined configuration parameters. The choice of which one or more field devices 250 to detect can be displayed on and input in a system controller interface 223 or I/O master interface 225.

By enabling auto-detection, a safe current, less than 4 mA, is driven through a current pathway 230 to one or more field devices 250. The safe current, such as 3.2 mA, is adequate to power the device electronics of one or more field devices 250 to enable current modulated digital communication therewith. For instance, an application of 3.2 mA will not make a change in a state of one or more field devices 250, such as a valve stem position, but will enable the reading of the actual digital configuration parameters of one or more field devices 250. These parameters are then used to configure system controller 205 and I/O master 220. Disabling auto-detector 240 will remove this safe current, thereby giving the user full control of the output current to one or more field devices 250, even though the 3.2 mA current is within safe limits.

In other words, at 4 mA field devices 250 are just at the beginning of the normal operating range. By providing a current less than that, there will not be enough current to make any change in the one or more field devices 250, other than just establishing the digital communication.

Generally, configuration system 200 provides a mechanism in I/O master 220 or system controller 205, perhaps through employment of system controller interfaces 223 or I/O master interface 225, to enable and disable automatic field device digital information detection for current sinking devices, such as one or more field devices 250, before a control strategy or configuration is loaded to controller 205 and the I/O master 220. Generally, when auto-detector 240 is enabled for one or more field devices 250, I/O master 220 drives a "safe" current, such as of 3.2 mA, to one or more field devices 250. This current is enough to power up most of one or more field devices 250 to establish digital communication. Generally, one reason a current such as 3.2 mA is safe is because it does not allow circuitry, such as valve circuitry, to operate on or within one or more field devices 250. This current is below 4 mA, which is the 0% output value as per 4-20 mA current HART signal standards.

When auto-detector 240 is disabled, (the default setting) for any particular device 251-255, pathway 230 to that particular devices is unpowered, providing drive zero current such that the digital configuration parameters for that particular device can not be read. When automatic device detection is enabled in the auto-detector 240 for any given one or more field devices 250 (or alternatively, all field devices) communication with one or more field devices 250 is established to collect device identification/configuration data from the one or more field devices 250. The collected digital information/configuration parameters collected can then also presented to the user in system controller interface 223 or I/O master interface 225 which also provided the option to enable/disable automatic detection for each field devices of one or more field devices 250.

After detection of one or more field devices 250 is complete, the digitally read and detected field device or field devices 250 can still be continuously monitored, using a low-priority polling scheme, as long as automatic device detection is enabled by auto-detector 240. Any change in one or more field device 250 configuration is therefore automatically updated on system controller interface 223 or I/O master interface 225 mentioned above, and can be used in reconfiguring system controller 205 and/or I/O master 220, respectively. This low-priority polling should have minor bandwidth loading on I/O master 220. In one embodiment of configuration system 200, if one or more field devices 250 are defective in some manner, system 200 removes minimal (less than 4.0 mA) current by disabling auto-detector 240. Both using a smaller current than minimally required to drive one or more field devices 250, such as 3.2 mA, and the capability of disabling auto-detector 240 enhance the safety of configuration system 200.

The auto-detector 240 is disabled when a control strategy is loaded. This helps to avoid two separate controls for the output current of I/O master 220 being applied at the same time. Once the control strategy is loaded, current to one or more field devices 250 is controlled only though the control strategy.

In the case of redundant I/O masters (not illustrated), the auto-detector 240 feature will take effect only in the currently-designated primary I/O master 220. However, the secondary I/O master will remember the user selections for each field device 250 and perform automatic device detection as soon as the secondary I/O master becomes a primary I/O Master following a switch-over. Finally, auto-detector 240 selection will not block the capability of I/O master 240 to shed outputs to a safe unpowered state in case of a failure.

In one embodiment, the loading of the control strategy does not disturb the current applied over current path 183, nor does loading the control strategy overwrite the configuration data that was loaded to system controller 205 and I/O master 220 derived from one or more field devices 250. An initial user configuration, that is, the configuration information that a user has before the actual reading of the digital information embedded in one or more field devices 250 can thus be validated by comparing it with actual device configuration data read from one or more field devices 250. After the comparison is made and perhaps the initial user configuration is corrected, the collection of one or more field devices 250 dynamic data, that is, data that configuration system 200 collects through monitoring events in real time, can be started immediately without the need to go through an entire power up and reading of configuration readings and reconfiguration of system controller 205 and I/O master 220 at 4-20 mA.

In one embodiment, auto-detector 240 selection is fully supported by one or more redundant I/O masters. If auto-detector 240 is enabled in a primary I/O master, and if it fails over (switches over to the secondary), the new primary I/O master will preserve the auto-detector 240 selection. In configuration system 200, if primary I/O master loses communication with the control system, outputs are then driven to some configured safe states. Unpowering, or removing the current, helps to ensure safe state configuration. The use of a safe current, such as 3.2 mA with auto-detector 240 does not obstruct this safety activity.

Figure 6:
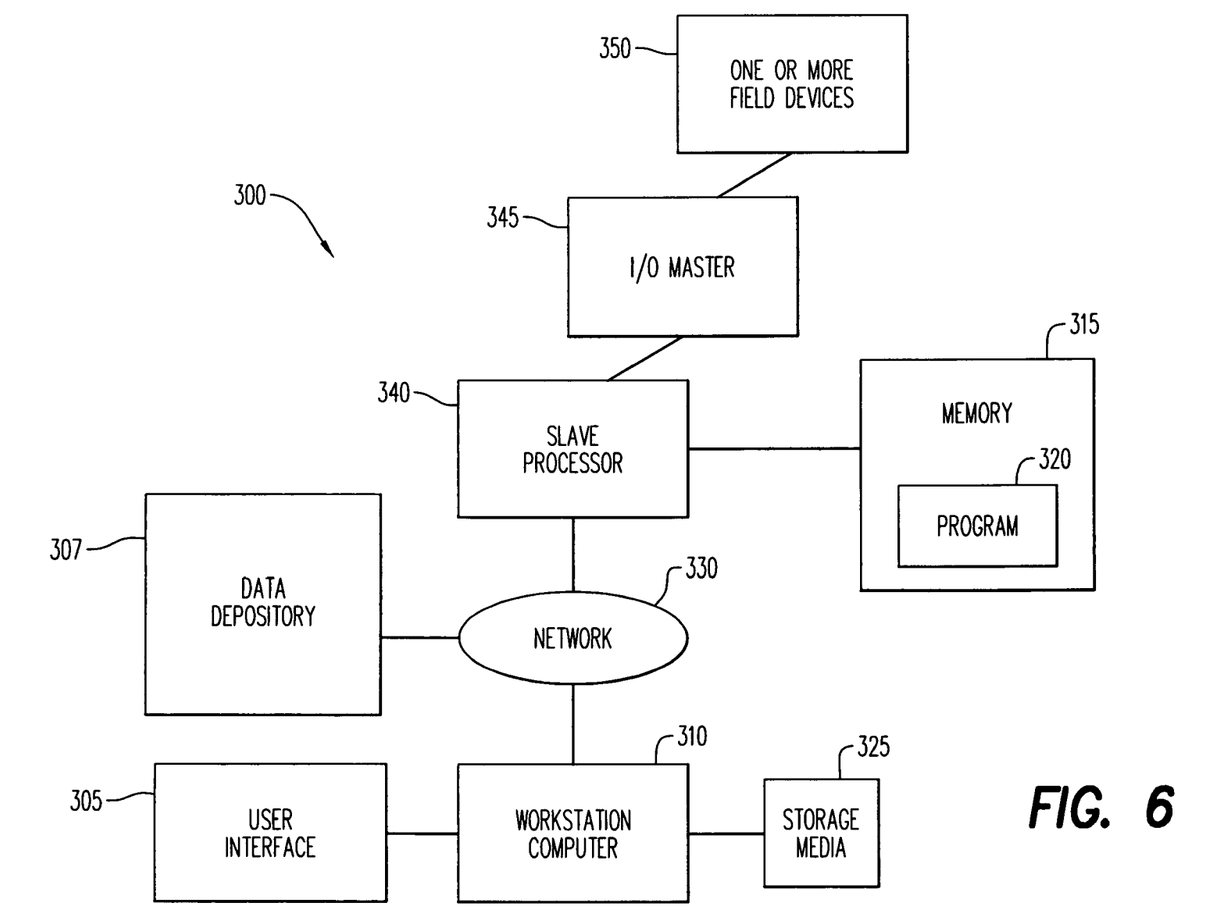
FIG. 6 is a diagram of a computer system in which a program for detecting configuration information of field devices could operate.

Referring to FIG. 6, illustrated is a block diagram of a computer system 300 adapted for employment of auto-detector 240 and the reading of the digital configuration information embedded in one or more field devices 350. Computer system 300 includes a workstation computer 310 with a storage media 325 and a user interface 305 coupled to workstation computer 310. User interface 305 includes an input device, such as a keyboard or speech recognition subsystem, for enabling a user to communicate information and command selections to workstation computer 310. A cursor control such as a mouse, track-ball, or joy stick, allows the user to manipulate a cursor on the display for communicating additional information and command selections to workstation computer 310. Computer system 300 presents an image of one or more field devices 250 and auto-detector 240 on system controller interface 223 or I/O master interface 225 as displayed on user interface 305, and provides a hardcopy of one or more field devices 250 digital configuration data via a printer.

Workstation computer 310 is coupled to a network 330. The network 330 is also coupled to a data depository 307. Network 330 is also coupled to a slave processor 340. Slave processor 340 is coupled to a memory 315. Memory 315 is a memory for storing data and instructions for controlling the operation of slave processor 340. An implementation of memory 315 could include a random access memory (RAM), a hard drive and a read only memory (ROM). One of the components of memory 315 is a program 320. Slave processor 340 is also coupled to one or more field devices 350.

Program 320 can includes instructions for controlling slave processor 340, system controller 205, I/O master 220, or current control to drive either the safe current or HART current to one or more field devices 350 by employing auto-detector 240. As a result of execution of program 320, slave processor 310 can reads the digital configuration data into memory 315 from one or more field devices 250, and can use this configuration data to configure system controller 205 or I/O master 220. Program 320 may be implemented as a single module or as a plurality of modules that operate in cooperation with one another.

While program 320 is indicated as already loaded into memory 315, it may be configured on a storage media 325 for subsequent loading into memory 315 by way of network 330. Storage media 325 can be any conventional storage media such as a magnetic tape, an optical storage media, a compact disk, or a floppy disk. Alternatively, storage media 325 can be a random access memory, or other type of electronic storage, located on a remote storage system.

Slave processor 340, through an I/O master 345, then configures one or more field devices 350 with the configuration data. Slave processor 340 then controls and monitors one or more field devices 350. I/O master 345 can correlate to I/O master 220.

Figure 7:
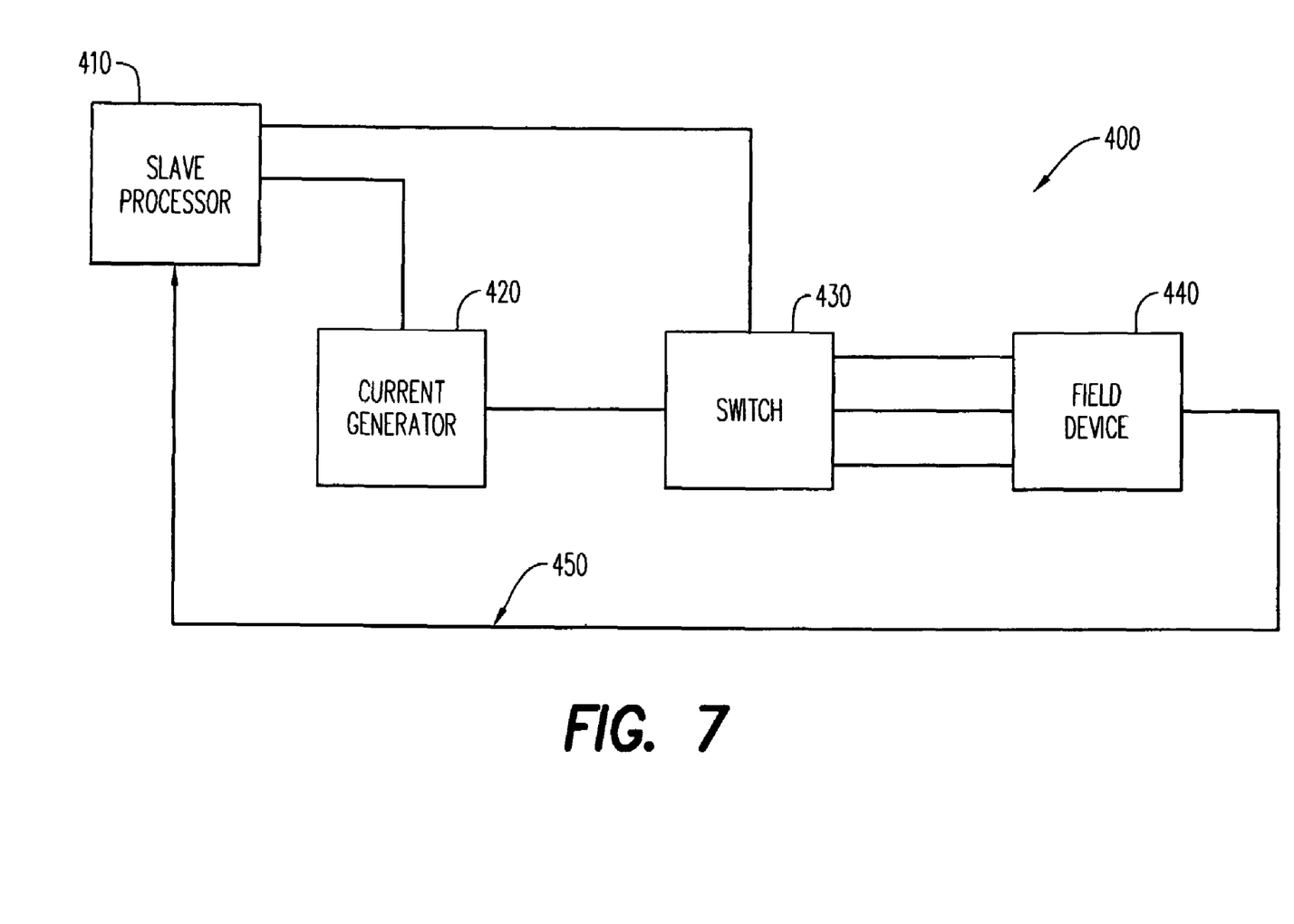
FIG. 7 is a diagram of a current generator that operates in a detection/filed device configuration reading mode and a field device operation mode.

In FIG. 7, in a current generation system 400, a slave processor 410 is coupled to a current generator 420. Both slave processor 410 and current generator 420 are coupled to a switch 430. Switch 430 has a plurality of connections to field device 440. Field device 440 has a feedback loop 450 coupled back to slave processor 410.

Generally, slave processor 410 instructs current generator 420 whether to generate a current in a safe mode, perhaps 3.2 mA, or the standard 4.0 to 20.0 mA. 4-20 mA is standard instrumentation signal range. Slave processor 410 instructs switch 430 to which field devices or field devices of field device 440 should have the current applied. Slave processor 410 then reads the configuration data embedded within field device 440 over feedback loop 450. Slave processor 410 can sense this configuration data, or alternatively, another device can extract the configuration data and then convey the configuration data to slave processor 410. In one embodiment, this configuration data is then conveyed to system controller 205 and I/O master 220 (not shown in this FIGURE). Then, slave processor 410, through switch 430, uses configuration parameter read from field device 440 to configure field device 440, using the a lower, safe current of less than 4.0 mA. Then, current generator 440 increases the current to the 4.0 to 20.0 mA range to operate field device 440.

It should be understood that various alternatives, combinations and modifications of the teachings described herein could be devised by those skilled in the art. The present invention is intended to embrace all such alternatives, modifications and variances that fall within the scope of the present invention.

What is claimed is:

1. A system comprising:
   a current generator that provides a first current level to read a configuration parameter of at least one field device, wherein said first current level is lower in amperage than a second current level and wherein said first current level does not operate said field device; said current generator also provides said second current, wherein said second current level operates said field device; and
   a current sensor connected in circuit with said field device wherein said current sensor detects said configuration parameter(s) associated with said first current level.

2. The apparatus of claim 1, further comprising a system controller connected in circuit to said current sensor.

3. The apparatus of claim 1, wherein said field device is configured as a function of said configuration parameter(s) of said field device.

4. The apparatus of claim 1, wherein said first current level is about 4.0 milliAmperes or less.

5. The apparatus of claim 1, wherein said first current level is about 3.2 milliAmperes or less.

6. The system of claim 1, wherein said second current level reads said configuration parameter(s) of said one or more field devices.

7. The system of claim 1, wherein said first current level that reads said configuration parameter(s) of said field device is interrupted.

8. The system of claim 7, further comprising an interface which communicates an indicia for the purpose of disabling said field device.

9. The system of claim 1, wherein a preset configuration parameter of said system is overwritten through employment of said current sensor that detects said configuration parameter(s) conveyed by said first current level.

10. A method comprising:
    generating a first current that reads a configuration parameter(s), said first current having an amplitude that is less than a second current that operates at least one field device wherein said first current does not operate said at least one field device; and
    reading said configuration parameter from said field device through use of said generation of said first current.

11. The method of claim 10, further comprising configuring said field device based upon said read configuration parameter(s).

12. The method of claim 11, further comprising generating an operating current, said operating current having an amplitude of current sufficient to operate said field device.

13. The method of claim 12, wherein said operating current is about 4.0 milliamps or higher.

14. The method of claim 12, wherein said operating current detects said configuration parameter(s).

15. The method of claim 12, wherein said first current is disabled upon said generation of said operating current.

16. The method of claim 12, wherein said configuration parameter reading current is disabled upon a request of an operator.

17. The method of claim 12, wherein said field device further comprises a plurality of field devices.

18. The method of claim 11, wherein said configuration parameter reading current is about 4 milliamps or less.

19. The method of claim 10, further comprising storing said configuration parameter in a data depository.

20. A storage medium comprising instructions for controlling a processor by the following steps:
- generating a first current that reads a configuration parameter, said first current having an amplitude that is less than a second current that operates at least one field device; and
- reading said configuration parameter(s) from said field device through said generation of said first current.

* * * * *